US011283776B2

(12) United States Patent
Moore

(10) Patent No.: US 11,283,776 B2
(45) Date of Patent: Mar. 22, 2022

(54) TUNNEL PORTALS BETWEEN ISOLATED PARTITIONS

(71) Applicant: Ralph Crittenden Moore, Costa Mesa, CA (US)

(72) Inventor: Ralph Crittenden Moore, Costa Mesa, CA (US)

( * ) Notice: Subject to any disclaimer, the term of this patent is extended or adjusted under 35 U.S.C. 154(b) by 20 days.

(21) Appl. No.: 16/899,479

(22) Filed: Jun. 11, 2020

(65) Prior Publication Data

US 2021/0392117 A1    Dec. 16, 2021

(51) Int. Cl.
| | |
|---|---|
| *G06F 15/167* | (2006.01) |
| *H04L 29/06* | (2006.01) |
| *H04L 67/56* | (2022.01) |
| *H04L 67/01* | (2022.01) |
| *H04L 67/12* | (2022.01) |
| *H04L 47/70* | (2022.01) |

(52) U.S. Cl.
CPC ........ *H04L 63/0428* (2013.01); *H04L 47/825* (2013.01); *H04L 63/20* (2013.01); *H04L 67/12* (2013.01); *H04L 67/28* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 5,233,611 A | * | 8/1993 | Triantafyllos | G06F 11/3688 714/46 |
| 5,974,547 A | * | 10/1999 | Klimenko | G06F 9/4416 709/217 |
| 2003/0126195 A1 | * | 7/2003 | Reynolds | G06F 11/2023 709/203 |
| 2005/0198247 A1 | * | 9/2005 | Perry | H04L 7/0008 709/223 |
| 2011/0131011 A1 | * | 6/2011 | Blackledge | H04L 43/10 702/186 |
| 2018/0136979 A1 | * | 5/2018 | Morris | G06F 9/5055 |
| 2020/0186355 A1 | * | 6/2020 | Davies | H04L 9/3239 |
| 2020/0220746 A1 | * | 7/2020 | Shribman | G06F 9/45545 |

\* cited by examiner

*Primary Examiner* — Phuoc H Nguyen

(57) ABSTRACT

This invention presents a method to create tunnel portals for exchange of information between client and server partitions by using protected messages. Tunnel portals replace function call APIs in order to achieve full isolation between client and server portals for security. They are capable of performing efficient multiblock data transfers as well as exchanging commands and responses. Client access to tunnel portals is limited at run time and can be priority-based. Servers can have multiple tunnel portals to access multiple subservers.

17 Claims, 10 Drawing Sheets

TUNNEL PORTALS BETWEEN ISOLATED PARTITIONS

CROSS-REFERENCE TO RELATED APPLICATIONS

Reference material for this application can be found in:
1. U.S. Pat. No. 10,635,831 B1 "Method to Achieve Better Security Using a Memory Protection Unit, Apr. 28, 2020 by Ralph Crittenden Moore,
2. U.S. Ser. No. 16/746,559 "Enhanced Security Via Dynamic Regions for Memory Protection Units (MPUs), Jan. 17, 2020 by Ralph Crittenden Moore, which are incorporated herein by reference in their entirety. In addition, two other MPU-related applications are being submitted simultaneously, by this author, which may be helpful.

PROGRAM LISTINGS portalc.c contains client portal functions.
portals.c contains server portal functions.
portal.h contains configuration and other constants, structures, and portal prototype functions.
tportal.c contains test functions that demonstrate usage of tunnel portals and test their operation.
tportal.h defines structures and constants to test tunnel portals.
fpcli.c shows shell functions for a file system API.
fpmap.h shows the mapping of file system functions to shell functions.
fprtl.h shows structure and IDs for a file system tunnel portal.
fpsvr.c shows tunnel portal server functions and definitions for a file system.

In order to run the foregoing code, it is necessary to have an evaluation copy of the SecureSMX RTOS. This is available for free download from ftp://ftp.smxrtos.com/pub1/patent_mpu345.zip. In addition, the IAR EWARM v8.20.1 development tools are needed. A free evaluation kit for these tools is available at www.iar.com. Also necessary is an ST Micro STM32746G-EVAL2 evaluation board to run the code. If this board is not available contact support@smxrtos.com for assistance in using another board.

BACKGROUND

As embedded systems are drawn more into the Internet of Things (IoT), hacks and malware attacks are becoming increasingly frequent. Thus, security of embedded systems is becoming increasingly important. One tactic to improve security is to divide the software of an embedded system into many isolated partitions. Then if a hacker gains access to one partition he cannot access code or data in other partitions.

Most embedded systems use Micro Controller Units (MCUs), which have lower performance processors and much less memory than other computer systems such as servers, desktop computers, or even smart phones. For memory protection, MCUs normally provide Memory Protection Units (MPUs) rather than Memory Management Units (MMUs) as are found in more powerful processors. Because of this and due to the fact that all MCU embedded system code is linked into a single executable, achieving full partition isolation is much more difficult in these systems than it is in more powerful systems using MMUs.

Partition isolation is achieved in MCU systems by defining code and data regions which are unique to each partition. A region consists of contiguous memory with a memory starting address, a memory size, and memory attributes. The attributes supported depend upon the MPU, but typically include read/write, read only, and execute never. When a task in a partition starts running, regions for its partition are loaded into the MPU. The MPU insures that only memory in these regions can be accessed and only as permitted by each region's attributes. This is very effective at thwarting malware.

A large majority of MCU-based systems that are in use are based upon the Armv7 Cortex-M architecture. Unfortunately the MPU in this architecture is difficult to use. Hence, very little use has been made of it and development of algorithms and software to use it are practically non-existent. The recently released Armv8 Cortex-M architecture corrects some of the problems, but it is not in widespread use yet and it shares some limitations with the Armv7 architecture.

The standard method to create regions is to use compiler pragmas in the source code to define which code or data goes into which section. Then a linker command file defines which sections go into a linker block. To this are added region size and region alignment in the linker command file to produce a region block. MPUs covered by this invention may also have subregions and subregion disables, which permit a region block to more closely fit the actual size needed. Finally the linker command file defines where the blocks go in memory.

The most common MPU size is 8 slots. Unfortunately, this is often too few slots to hold enough regions for a running task such that the regions can be unique for the task. Even worse, some processors have MPUs with only 4 slots. As a consequence, it is often necessary to use regions that are common between tasks, or regions that span regions used by other tasks. Doing so results in tasks and partitions that are not fully isolated. This provides a hacker with a path from one partition to another, which reduces system security.

SUMMARY OF THE INVENTION

The subject matter of this invention is the introduction of tunnel portals to allow client partitions to access server partitions in a completely secure manner and with minimal performance degradation. Tunnel portals make use of protected messages to create tunnels between two partitions without violating the security of either partition. Dividing partitions into client and server partitions allows reducing the number of regions required by each, thus helping to overcome the MPU slot limitation problem referred to in the preceding section. At the same time, the need for common regions between partitions is eliminated, further improving security. Tunnel partitions may be adopted without changing client code and without suffering great performance reduction. Hence they are a practical means to improve embedded system security significantly.

DETAILED DESCRIPTION

The following information describes a simple embodiment of the invention sufficient to explain how it works. The term "application" is understood to mean the software in an embedded device that performs the functions of that device. Figures 1and 2 illustrate the structure and operation of the preferred embodiment. They are for reference, and not part of the inventive material.

Figure 1:
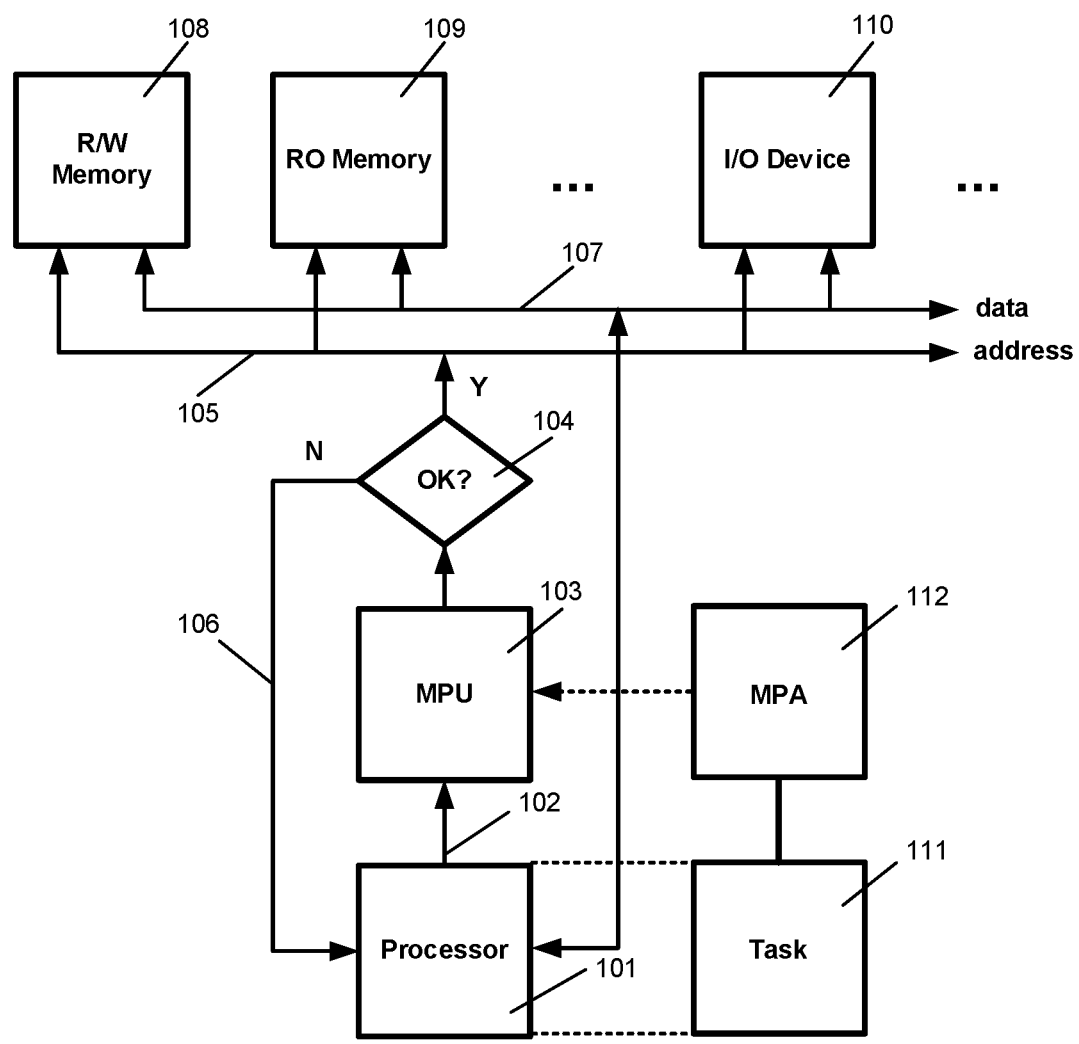
FIG. 1 shows the preferred embodiment of the inventive material herein.

FIG. 1 shows the preferred embodiment of this invention consisting of processor 101 sending a memory address 102 to a Memory Protection Unit (MPU) 103. The MPU 103 compares the address 102 to its regions and passes the address on to the system address bus 105 if it is ok. Otherwise, MPU 103 sends a Memory Mange Fault (MMF) exception 106 back to processor 101 and no access to memory nor FO occurs.

If ok, address 102 is sent to Read/Write Memory 108, Read-Only Memory 109, and I/O Device 110 and any other memories or devices connected to address bus 105. Whichever of these devices recognizes the address then receives data from processor 101 via system data bus 107 or sends data to processor 101 via system data bus 107.

FIG. 1 also shows that MPU 103 is loaded from Memory Protection Array (MPA) 112 at the time that its task 111 starts running on processor 101. Each task 111 has its own MPA 112, which contains the regions that it is allowed to access.

It should be apparent, to one skilled in the art, that other embodiments are possible, such as: multiple processors (either multiple cores on the same chip or multiple processors on different chips), multiple MPUs each connecting to the same or to different system buses, multiple system buses, and other types of memory.

Figure 2:
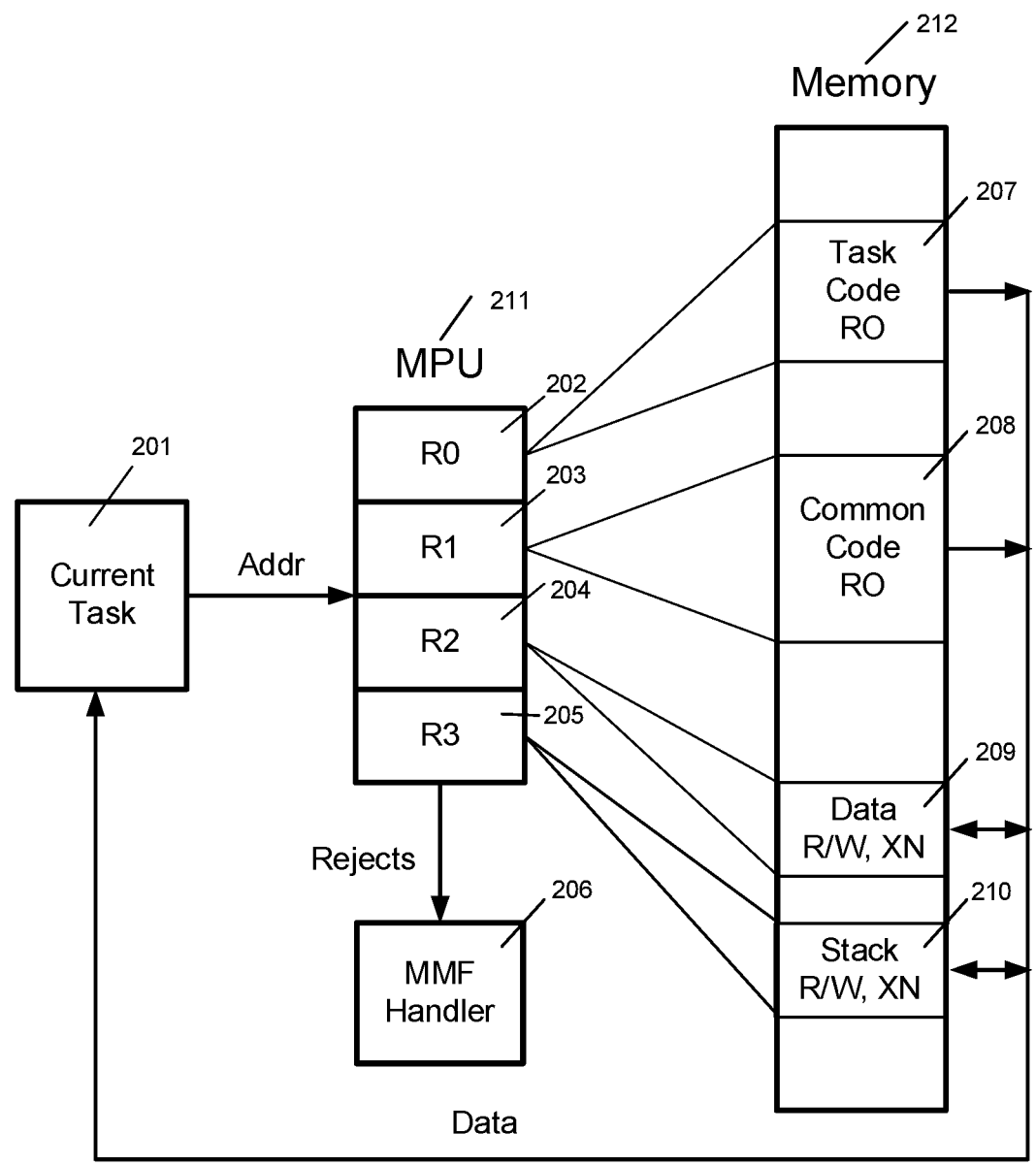
FIG. 2 illustrates MPU operation. Each region in the MPU allows access to a specific memory region with attributes, as shown.

FIG. 2 illustrates typical MPU operation. It shows task 201 sending an address to MPU 211 having 4 regions, as follows: Region 202 addresses task code read-only region 207 in memory 212. Region 203 addresses common code read-only region 208. Region 204 addresses data read/write, execute-never region 209. Region 205 addresses stack read/write, execute-never Region 210. An address that does not fall into one of these regions or does not have the correct attributes goes to the Memory Manage Fault Handler (MMF) 206. Otherwise, task 201 is allowed to read or write the desired data.

For simplicity, FIG. 2 shows 4 MPU regions. However, it should be apparent, to one skilled in the art, that it applies equally to MPUs with 8, 16, or any other number of regions.

Figure 3:
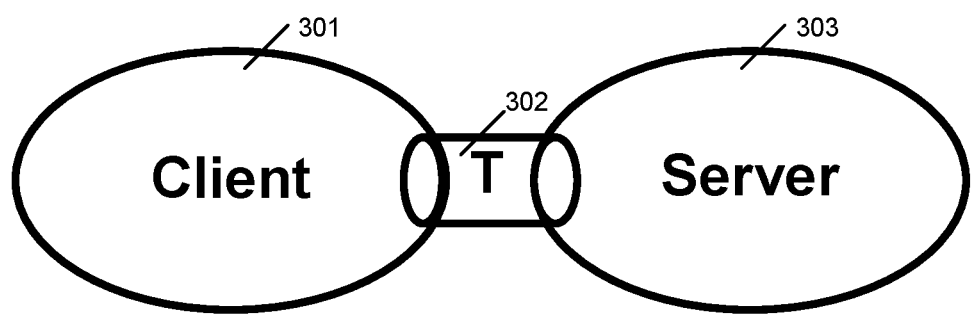
FIG. 3 illustrates how a tunnel portal, T, tunnels between a client partition and a server partition to enable information exchange between them.

FIG. 3 illustrates the concept of a tunnel portal. The tunnel portal 302 is a protected region shared between a client partition 301 and a server partition 303, which allows exchange of information between the partitions.

In the description that follows, server generally means a server task and client generally means a client task.

Figure 4:
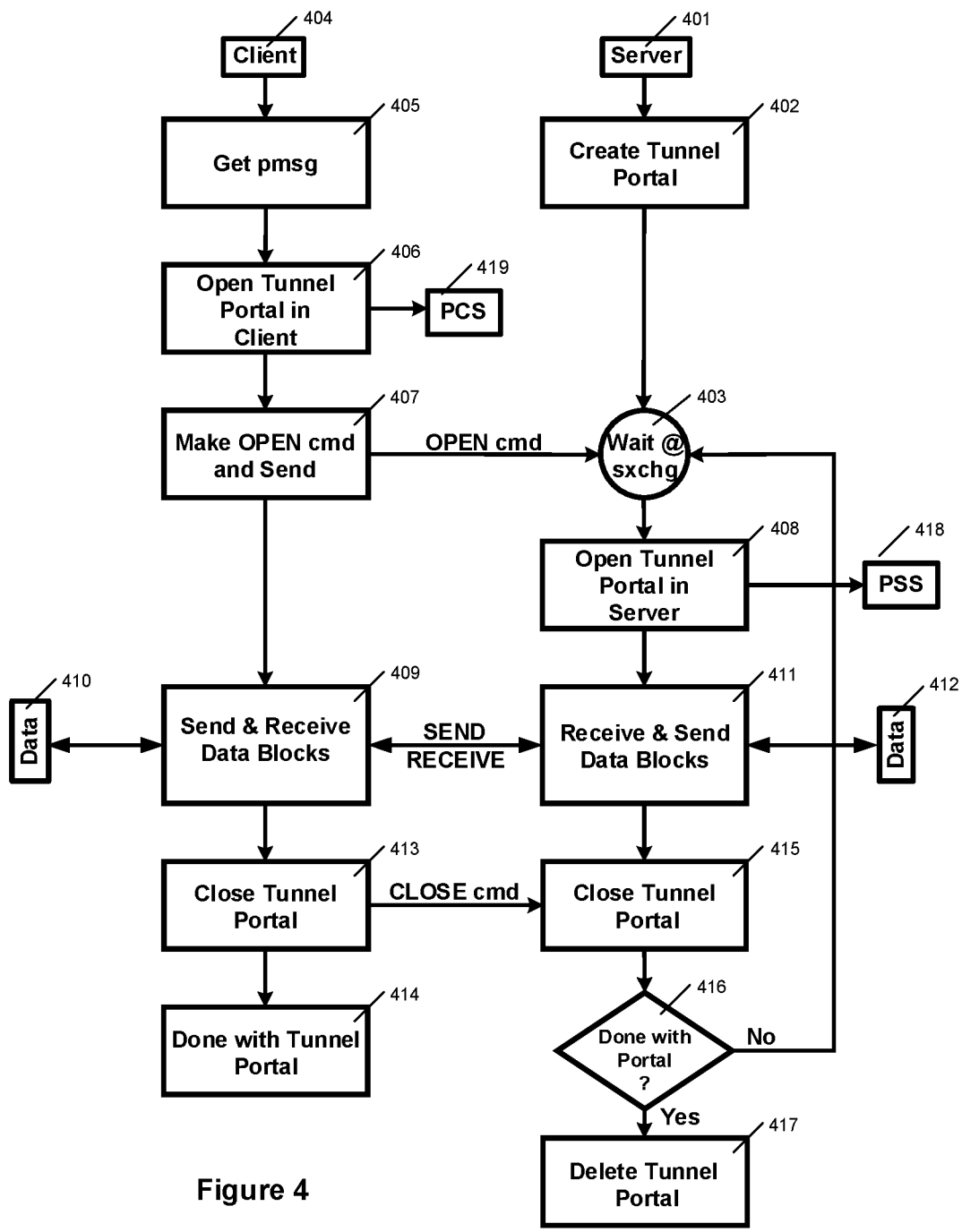
FIG. 4 illustrates overall operation of a tunnel portal including creating the portal, opening it, data sending and receiving, and finally closing the portal.

FIG. 4 shows the overall operation of a tunnel portal. Server 401 and Client 404 are partitions, each having at least one task. Server 401 starts by creating tunnel portal 402. This operation is detailed in FIG. 5. Then server 401 waits at sxchg 403.

Client 404 gets a protected message pmsg 405. The pmsg data block can be obtained from any heap, block pool, or standalone block, as long as it meets MPU region size and alignment requirements. If the data block is in an existing client region, a phantom MPA slot can be used for it. Otherwise, an active MPU slot must be used. pmsg 405 is bound to client 404 so that only client 404 can send it or release it. In the description that follows, the pmsg data block is referred to as portal buffer, pbuf. Client 404 opens tunnel portal 406 on the client side and loads portal information into its portal client structure, PCS 419. It then makes and sends 407 an OPEN command in pmsg 405 to sxchg 403. This operation is detailed in FIG. 6.

Server 401 receives the pmsg 405 from sxchg 403. It loads its pbuf region into designated slots it the MPU and in the server's MPA. Server 401 can now access the OPEN command in pbuf. In the OPEN operation 408, information is loaded from the OPEN command into the portal server structure, PSS 418.

Figure 7:
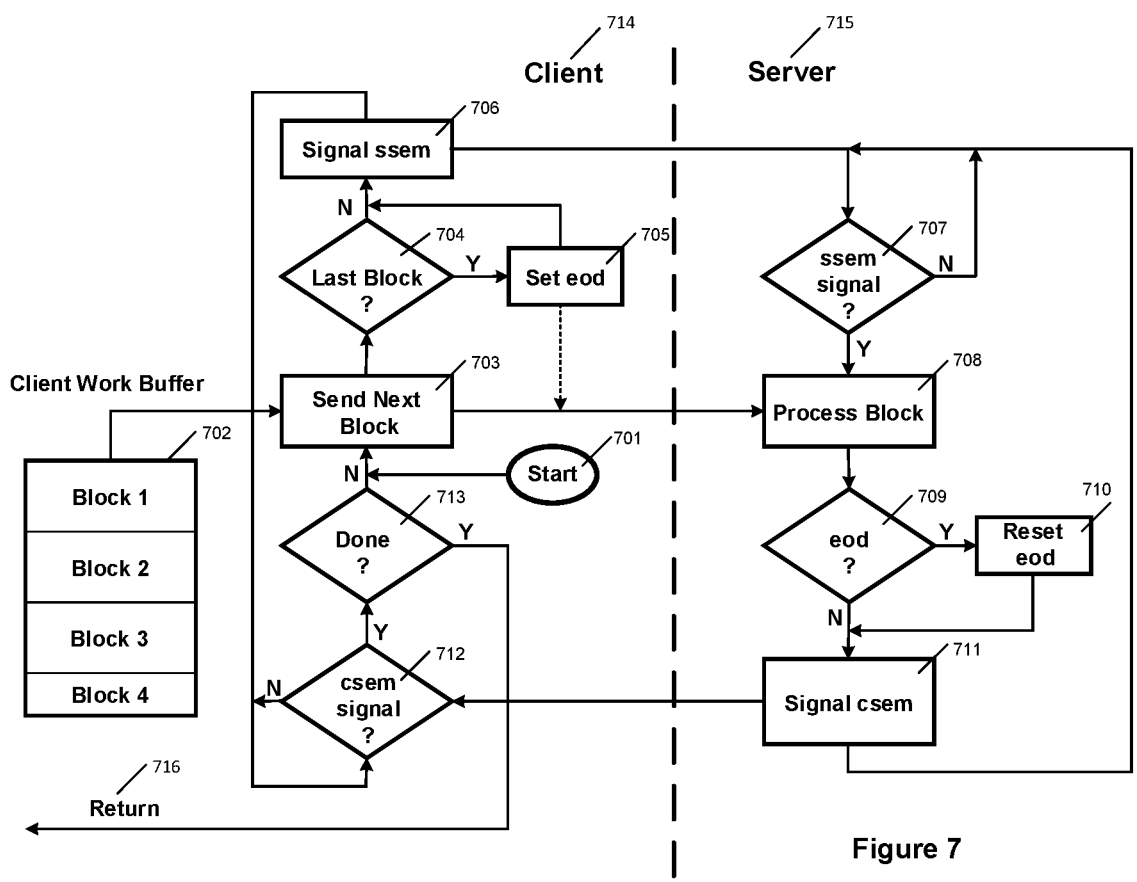
FIG. 7 details multi-block data sending of FIG. 4 by the client.

Send and receive operations can now be performed using SEND and RECEIVE commands. For SEND, client 404 accesses data from its working buffer 410, loads it into pbuf 409, then server 401 accesses the data from pbuf 411 and writes it to its working buffer 412. For RECEIVE, the opposite takes place. FIG. 7 details multiblock send operation. Single block operations are used to transfer commands and responses.

If the tunnel portal is to be used by other clients, client 404 must close it when done with its transaction. Even if a portal is not shared, it may make sense to close it in order to save resources (e.g. semaphores and memory). Client 404 sends a CLOSE command via pbuf to server 401. It is then done with the portal 414 and ready to do other work.

When server 401 receives the CLOSE command it clears all client information in its PSS 418 and waits at sxchg 403 for the next OPEN pmsg. If the portal is no longer needed, it can be deleted 417 by system code, which first stops the server task. Then sxchg 403 and rxchg are deleted, their aliases in PCS 419 are deleted and PSS 418 is cleared.

Figure 5:
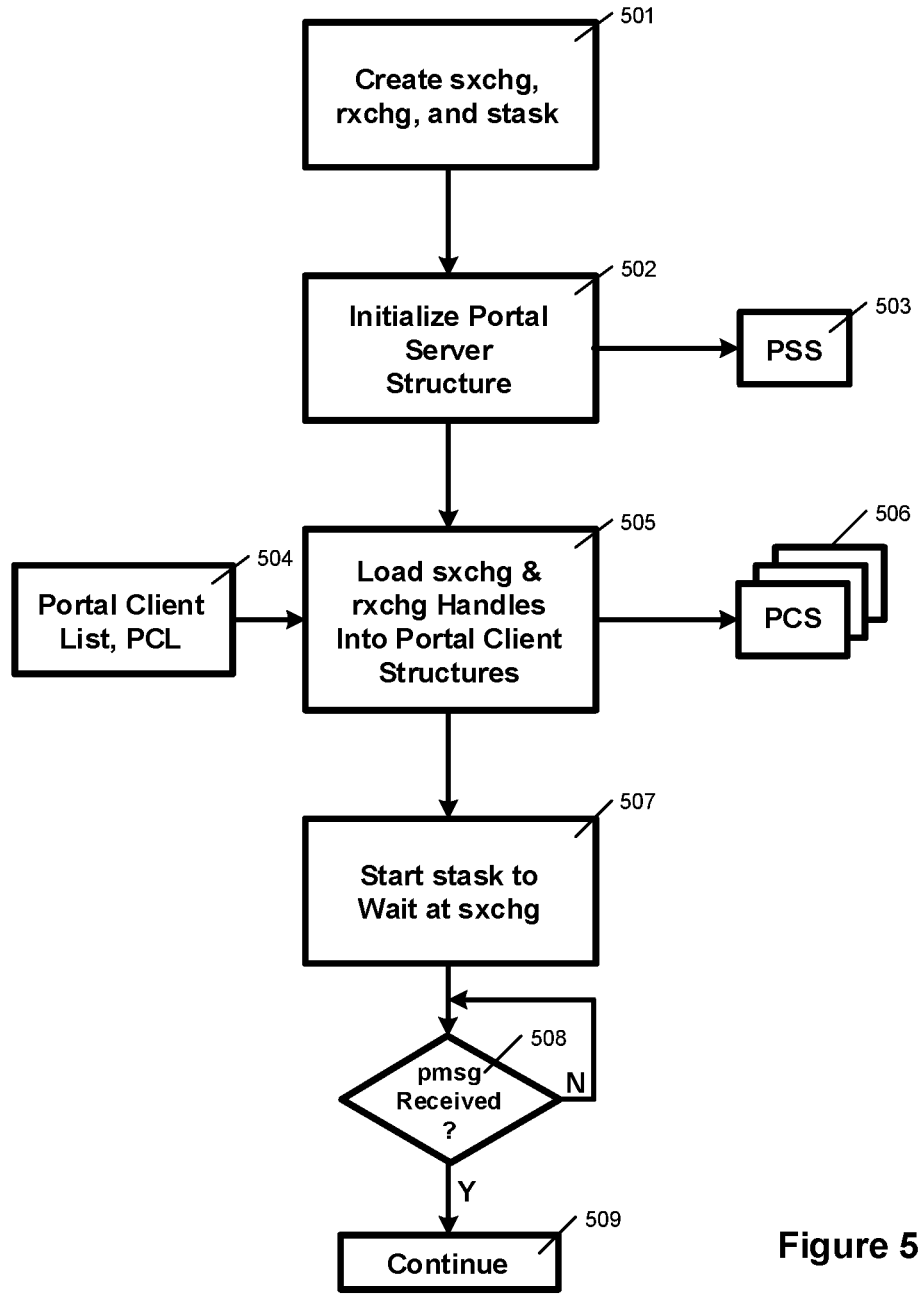
FIG. 5 details tunnel portal creation of FIG. 4 by the server.

FIG. 5 details creating a server portal. This is normally done by server initialization code. First the server exchange, reply exchange, and server task 501 are created. Each server has a Portal Server Structure, PSS 503, which is defined in the server code. Next, PSS 503 is initialized 502. Each client has a Portal Client Structure, PCS 506 for each portal that the client is permitted to access. Each server portal has a Portal Client List, PCL 504, which contains the PCS handles of clients permitted to access the portal. Using PCL 504 the sxchg and rxchg handles are loaded into each PCS 506. Without these handles a client cannot access the server portal. Finally the stask is started 507 and sent to wait at sxchg 508 for a pmsg from a client. When a pmsg is received stask continues 509.

Figure 6:
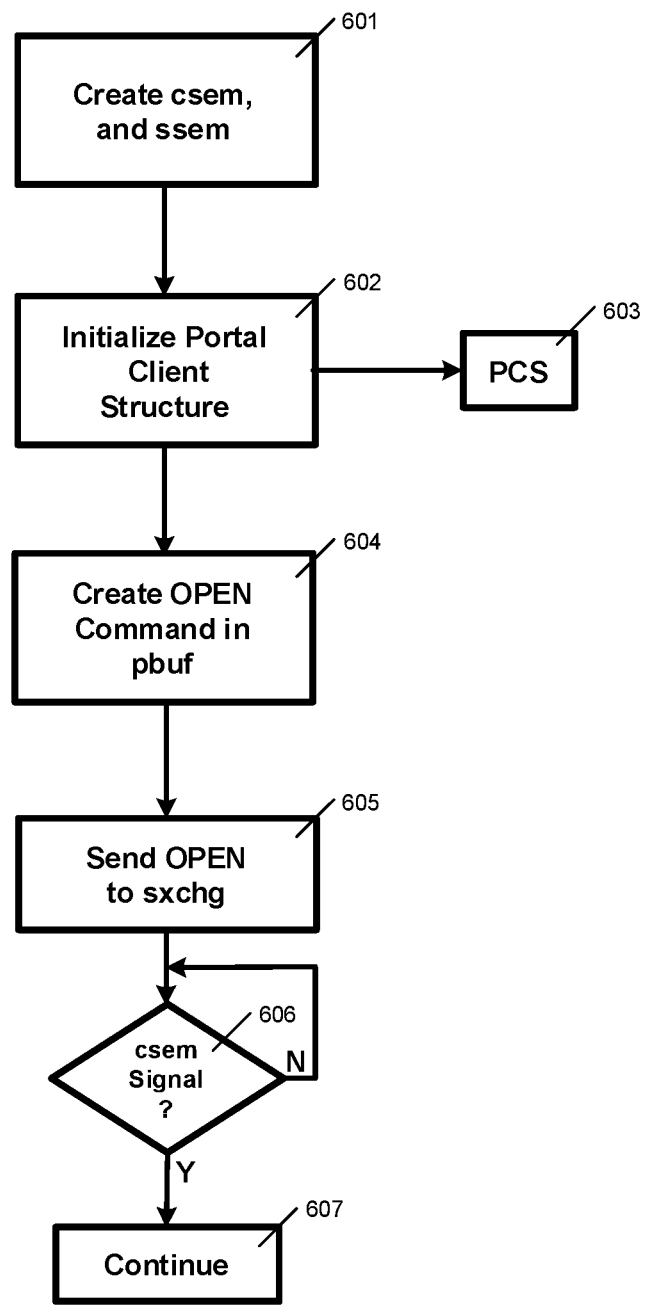
FIG. 6 details tunnel portal opening of FIG. 4 by the client.

FIG. 6 details opening the client side of a portal. The client first creates 601 client semaphore, csem, and server semaphore, ssem. Then the client initializes 602 the Portal Client Structure, PCS 603 and it creates 604 the OPEN command in pbuf, which contains the csem and ssem handles and other information for the server. The client sends the OPEN message to the portal sxchg and waits 606 at csem for a signal from the server that the portal is open. When a signal is received, it continues 607.

FIG. 7 details sending a multiblock message. This occurs when the client buffer 702 is larger than pbuf. Operation begins at Start 701 in the center of the diagram. Client task 714 copies 703 the first block from buffer 702 to pbuf, signals ssem 706, then waits at csem 712. The ssem signal causes server task 715 to start running. It accepts the data block in pbuf and processes it 708. For example, this could mean calling the file write function to write what is in pbuf to a disk drive. Then server task 715 signals 711 csem and waits at ssem 707 for the next block The csem signal 711 causes the client task 714 to resume running. If all blocks have been sent 713, control returns to the point of call 716. Otherwise, the next block, is loaded into pbuf 703, and the process repeats. In this example, four send operations are necessary to send all of buffer 702. When the last block is being sent, the end of data, eod 705 flag in pbuf is set. After it has handled the last block, server task 715 resets eod 710, signals csem 711, and waits at ssem 707 for the next command.

Receive is the reverse process of the above and its flow chart looks nearly the same as send and so it is not repeated here.

Figure 8:
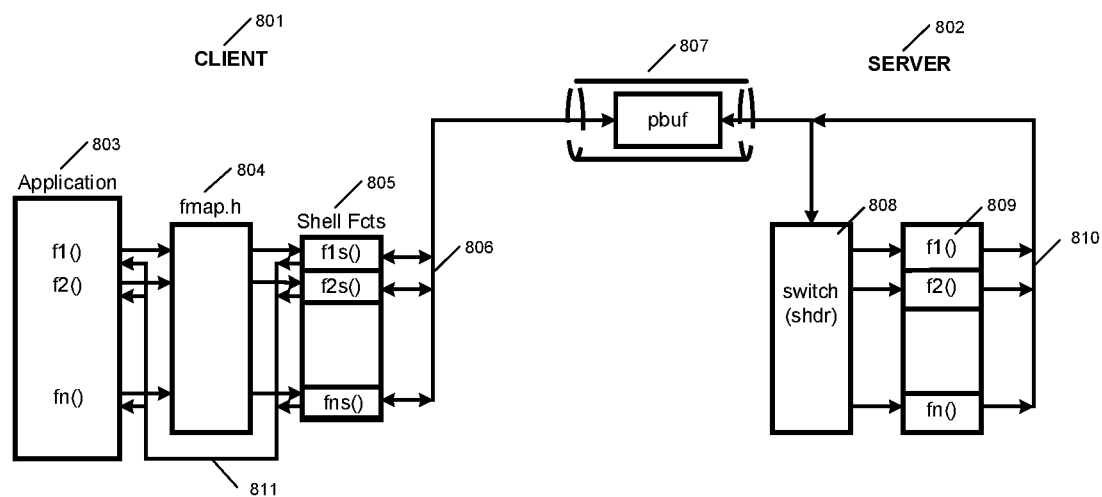
FIG. 8 shows how using a tunnel portal replaces a direct server call API with shell functions in the client and a switch statement in the server.

FIG. 8 shows how tunnel portal 807 is used to replace direct server function calls 809. The application code 803 of client 801 calls a server function fx( ). fx( ) is mapped by fmap.h 804 to a shell function fxs( ) 805, which converts the function call to a message consisting of a unique function i.d., function parameters, and any related data and loads 806 it into pbuf in tunnel portal 807.

Server 802 accepts the message and switches 808 on the function i.d. to call fx( ) 809 with parameters from the message and any related data. Function fx( ) 809 executes normally in server 802 and returns a value and possibly data 810, which is passed back via pbuf in tunnel portal 807 to shell function fxs( ) 805, which returns it 811 to the point of call in application 803.

Thus, client 801 operation can be switched from direct function calls 809 to using tunnel portal 807 without any changes to application code 803 other than to replace the function prototype header file with fmap.h 804. Server code modification is also minimal, consisting primarily of the addition of tunnel portal code and switch statement 808.

Figure 9:
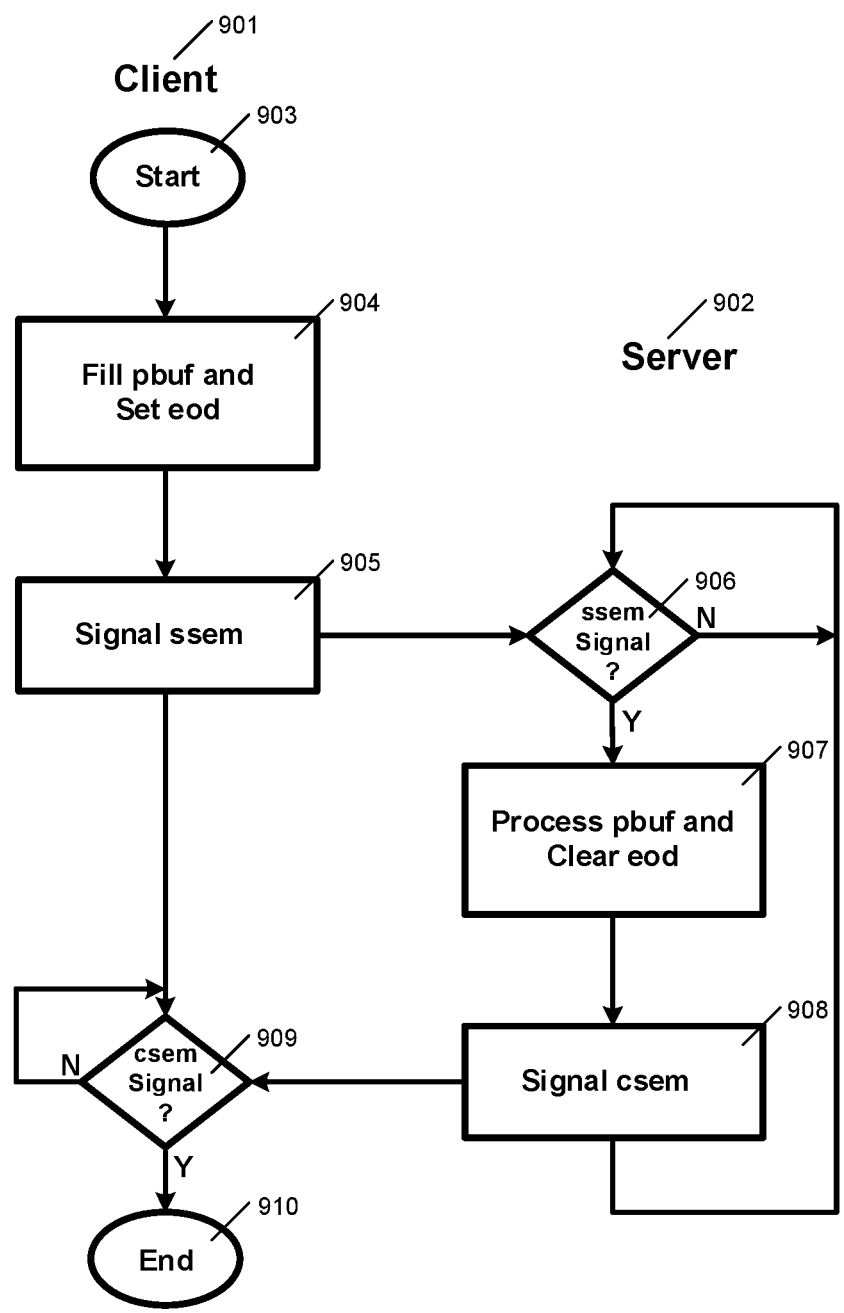
FIG. 9 shows no-copy operation for data send.

FIG. 9 shows no-copy operation for data send. Client task 901 starts 903 by filling pbuf with data up to the size of pbuf and setting end of data flag, eod 904. It then signals server semaphore, ssem 905 and waits at csem 909. Server task 902 resumes operation when the signal is received and processes data in pbuf and clears eod 907. It then signals 908 client semaphore, csem 909 where client task 901 waits and waits at ssem 906. This ends the operation 910. No-copy operation is generally used to send commands from client 901 to server 902 and can also be used to send data up to the size of pbuf.

No-copy receive is the reverse process and its flow chart looks nearly the same as no-copy send so it is not repeated here.

Figure 10:
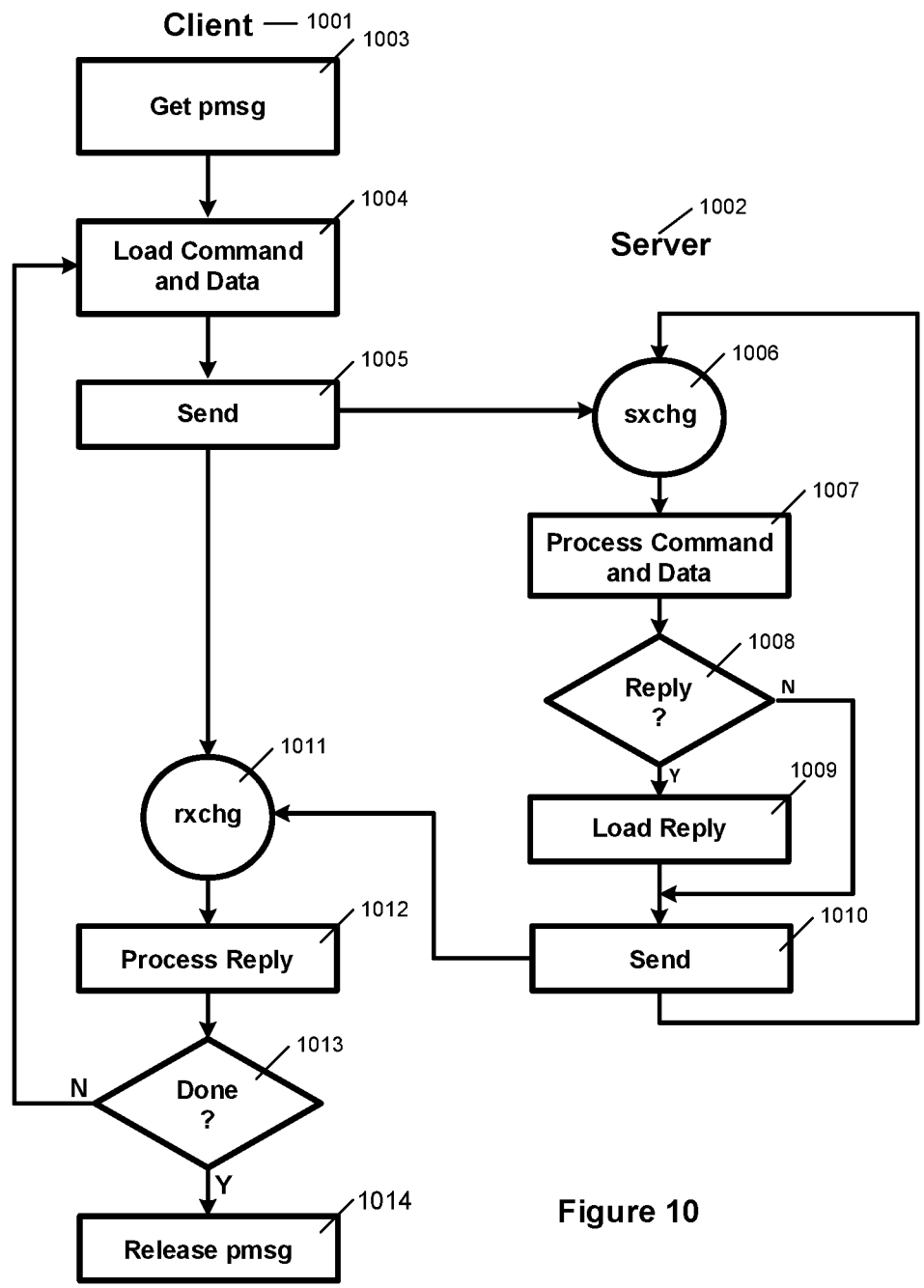
FIG. 10 shows tunnel portal operation with a free message.

FIG. 10 shows tunnel portal operation with a free message. A free message is not bound to the client as is a tunnel portal message. Client task 1001 gets a pmsg 1003 and loads 1004 a command and data into it, then sends 1005 the pmsg as a free message to sxchg 1006 and waits at rxchg 1011. Server task 1002 waiting at sxchg accepts the free message, loads its region into the MPU then processes 1007 the command and data in the free message. If a reply is requested 1008, server task 1002 loads the reply into the free message 1009, then the free message is sent 1010 to rxchg 1011 where waiting client task 1001 receives it, loads its region into the MPU then processes the reply 1012 and if done 1013 releases the pmsg 1014, otherwise the process repeats 1004. Free messages provide a low-overhead method for system software to control or query a server.

CONCLUSIONS, RAMIFICATIONS, AND SCOPE

The novel aspects of this inventive material are:
The use of protected messages, pmsgs, which have the unusual property of carrying their own MPU regions with them. When received, the pmsg region is loaded into an MPU slot and into the server task's MPA and thus its data block, called pbuf, becomes accessible by the server task.
The client retains the pmsg region so that it can also access pbuf. Hence pbuf becomes a tunnel portal through which information can be exchanged between client and server, without either being able to access the other's regions. Hence, both are safe if the other becomes infected with malware.
If the client obtains the pmsg from its own space, it can use a phantom slot in its MPA for the pmsg region, thus saving it from having to use an MPU slot. Although, in this case, pbuf is actually part of the client space, the server cannot access memory outside of pbuf, thus the rest of the client space is secure from a potentially infected server.
The use of a message exchange as the portal entry point. Message exchanges have useful properties for portals, such as:
Messages can wait at an exchange in priority order. This provides a simple method to share a portal between clients, to prioritize client access, and to create work queues for servers.
A client can assign a priority to a message that, in turn, is passed to the server. Thus the client can control the priority at which the server processes its requests. If, for example, server priority is one greater than client priority, the server will preempt the client, perform the function, then suspend and allow the client to resume. This is similar, in effect, to a direct function call. Alternatively, if the server priority is the same as the client priority, the client will continue and the server will execute each request when the client is suspended. This would be useful if the result of the request is not needed by the client, such as logging some information for future use.
The server is anonymous; it can be replaced with a different server at any time, without changing the client code. This is useful for handling different or changing environments. For example, in one case the server may send system logs out on a network and in another case store them on a disk drive.
The portal client list controls which clients can access the portal. The list contains addresses of client portal structures so that the portal's sxchg handle can be loaded into them and those clients can access the portal. Clients without this handle cannot access the portal. This prevents unauthorized clients from accessing servers.

A server can create multiple portals, each providing access to one or more of its subservers. An example of subservers are the class drivers of a USB host stack.

The server waits at the message exchange for the next pmsg containing an OPEN command After the portal is open, the client and the server coordinate command and data transfers using semaphores and the pbuf tunnel. This facilitates faster multi-block data transfers between client and server versus using a message-by-message via sxchg approach.

pbuf can be used as the working buffer of either client or server, thus implementing no-copy operation for faster data and command transfers.

The client retains ownership of the pmsg so only it can release or send the pmsg. This provides additional protection of clients from potentially infected servers.

Tunnel portals can accept single-use free pmsgs for commands or small amounts of data, thus saving the overhead of opening and closing tunnel portals. Such free pmsgs can be mixed with open pmsgs at the portal's sxchg. Higher message priority can be used such that a free pmsg bypasses waiting open pmsgs. For example, system software may need to shut down the server quickly to avoid equipment damage or operator injury.

A free pmsg, with its command replaced by a response, can be returned to a reply exchange, rxchg, where the client waits. Selection of the rxchg is controlled by the client. This provides additional protection of clients from potentially infected servers.

Tunnel portals provide flexible and powerful portals between clients and servers that permit full portal isolation while maintaining acceptable performance.

The invention claimed is:

1. Method to create tunnel portals for exchange of information between isolated partitions by using protected messages in an embedded system with a memory protection unit and consisting of:
   creating a tunnel portal in a server partition consisting of a server portal task and a server message exchange and causing said server task to wait at said message exchange for an open protected message;
   creating said protected message in a client partition, consisting of a protected data block and a message control block, wherein the said memory protection unit region information for said protected data block is contained in said message control block;
   opening said tunnel portal in said client partition consisting of creating a client semaphore and a server semaphore and sending an open command in said protected message containing said semaphore addresses and other portal information to said server exchange;
   receiving said protected message from said server exchange by said server task, and loading said region information from said protected message control block into a memory protection unit slot for said server task, thus enabling said server task to access said open command in order to complete opening said tunnel portal using said protected data block as the portal buffer for exchange of data and commands and using said semaphores to coordinate operations between said client task and said server task;
   preparing a client list for said tunnel portal so that during said tunnel portal creation, the address of said server message exchange can be passed to every client in said client list.

2. The method of claim 1 wherein multiple said tunnel portals can be created per said server in order to permit simultaneous access to subservers of said server.

3. The method of claim 1 wherein said client task retains ownership of said protected message so that only said client task can send or release said protected message.

4. The method of claim 1 wherein a working buffer in said client is copied to said portal buffer, block-by-block, then transferred block-by-block to a working buffer in said server, thus achieving multi-block send operation.

5. The method of claim 1 wherein a working buffer in said server is copied to said portal buffer block-by-block, then transferred block-by-block to a working buffer in said client, thus achieving multi-block receive operation.

6. The method of claim 1 wherein no-copy operation is achieved for said client by using said portal buffer as said client working buffer.

7. The method of claim 1 wherein no-copy operation is achieved for said server by using said portal buffer as said server working buffer.

8. The method of claim 1 wherein said portal buffer is used to transfer commands from said client to said server and to receive responses from said server to said client.

9. The method of claim 1 wherein said protected message is assigned a priority by said client and said server exchange has a priority message queue so that access to said server is determined by said protected message priorities.

10. The method of claim 9 wherein said server exchange passes said protected message priority to said server task so that it operates at said priority.

11. The method of claim 1 wherein said server exchange has a first-in-first-out message queue so that all said clients get equal access to said server.

12. The method of claim 1 wherein said server semaphore timeout permits said server task to abort operation and to wait for the next protected message at said server exchange.

13. The method of claim 1 wherein said client semaphore timeout permits said client to abort operation and close said tunnel portal.

14. The method of claim 1 wherein client shell functions replace direct server functions by converting them to messages in said portal buffer and a switch statement in said server converts said messages to said direct server function calls and returns results to said client, thus permitting conversion of said client from using said direct server function calls to using said tunnel portal with no change to said client code.

15. The method of claim 1 wherein said server task accepts a free protected message from said server exchange instead of said open protected message, thus permitting direct commands and small data transfers.

16. The method of claim 15 wherein a reply message exchange can be created with said tunnel portal and said server task can return a response to said client via said reply exchange.

17. The method of claim 1 wherein if said protected message data block is obtained from said client region, then said protected message region can be stored in a phantom slot of said memory protection array so that an active slot in said memory protection need not be used.

* * * * *